United States Patent
Cai et al.

(10) Patent No.: US 10,402,867 B2
(45) Date of Patent: Sep. 3, 2019

(54) COMPUTERIZED METHOD AND SYSTEM FOR PERSONALIZED STORYTELLING

(71) Applicant: NANYANG TECHNOLOGICAL UNIVERSITY, Singapore (SG)

(72) Inventors: Yundong Cai, Singapore (SG); Zhiqi Shen, Singapore (SG); Chunyan Miao, Singapore (SG); Liang Zhang, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 94 days.

(21) Appl. No.: 15/128,425

(22) PCT Filed: Mar. 25, 2015

(86) PCT No.: PCT/SG2015/000092
§ 371 (c)(1),
(2) Date: Sep. 22, 2016

(87) PCT Pub. No.: WO2015/147747
PCT Pub. Date: Oct. 1, 2015

(65) Prior Publication Data
US 2018/0012261 A1    Jan. 11, 2018

Related U.S. Application Data

(60) Provisional application No. 61/970,081, filed on Mar. 25, 2014.

(51) Int. Cl.
*G06Q 30/00* (2012.01)
*G06Q 30/02* (2012.01)
(Continued)

(52) U.S. Cl.
CPC ....... *G06Q 30/0271* (2013.01); *G06K 7/1417* (2013.01); *G06K 19/06037* (2013.01); *G06Q 30/02* (2013.01)

(58) Field of Classification Search
None
See application file for complete search history.

(56) References Cited

U.S. PATENT DOCUMENTS

2006/0259371 A1* 11/2006 Perrier ................ G06Q 10/087
705/27.1
2008/0065509 A1   3/2008 Williams
(Continued)

FOREIGN PATENT DOCUMENTS

CN   101820436 A   9/2010
CN   103514242 A   1/2014
(Continued)

OTHER PUBLICATIONS

Foreign Correspondence From a Related Counterpart Application, International Search Report and Written Opinion dated May 28, 2015, International Application No. PCT/SG2015/000092 filed on Mar. 25, 2015.
(Continued)

*Primary Examiner* — Matthew T Sittner

(57) ABSTRACT

A method and system are proposed for presenting information relating to a product to a potential customer for the product, upon the user scanning a 2D barcode using a mobile device. The information is presented to the customer as a story generated by an agent-based storytelling system. The story is personalized to the customer using online multimedia. It can be used to conduct mobile branding and advertisement, and is able thereby to augment offline shopping with online shopping experience.

8 Claims, 3 Drawing Sheets

(51) Int. Cl.
  *G06K 7/14* (2006.01)
  *G06K 19/06* (2006.01)

(56) References Cited

U.S. PATENT DOCUMENTS

| | | | | |
|---|---|---|---|---|
| 2012/0079360 | A1* | 3/2012 | Canora | G11B 27/034 715/202 |
| 2012/0246611 | A1* | 9/2012 | Sawant | G06F 8/35 717/104 |
| 2013/0060821 | A1* | 3/2013 | Miller | G06Q 30/02 707/803 |
| 2013/0065509 | A1* | 3/2013 | Roberts | H04H 20/103 455/3.02 |
| 2013/0126599 | A1* | 5/2013 | Soske | G06Q 30/02 235/375 |
| 2013/0246521 | A1* | 9/2013 | Schacht | G06Q 50/01 709/204 |
| 2013/0254038 | A1* | 9/2013 | Bradley | G06Q 30/0267 705/14.64 |
| 2014/0287779 | A1* | 9/2014 | O'Keefe | H04W 4/02 455/456.3 |
| 2014/0379533 | A1* | 12/2014 | Liberson | G06Q 30/0643 705/27.2 |
| 2015/0127418 | A1* | 5/2015 | Piepgrass | G06Q 30/0201 705/7.29 |
| 2015/0193457 | A1* | 7/2015 | Radhakrishnan | G06F 16/285 707/812 |
| 2015/0199727 | A1* | 7/2015 | Naveh | G06Q 30/0269 705/14.66 |
| 2018/0012261 | A1* | 1/2018 | Cai | G06Q 30/02 |

FOREIGN PATENT DOCUMENTS

| | | |
|---|---|---|
| WO | 2007053898 A1 | 5/2007 |
| WO | 2008043143 A1 | 4/2008 |
| WO | 2015147747 A1 | 10/2015 |

OTHER PUBLICATIONS

Jonathan Gottschall, "Why storytelling is the ultimate weapon?" http://www.fastcocreate.com/1680581/why-storytelling-is-the-ultimate-weapon.

Yundong Cai, Zhiqi Shen, Chunyan Miao, Ah-Hwee Tan: DIRACT: Agent-Based Interactive Storytelling. International Conference on Agent Technology 2010: 273-276.

F. Charles, S. Mead, and M. Cavazza. Character-driven story generation in interactive storytelling. In Virtual Systems and Multimedia, 2001. Proceedings. Seventh International Conference on, pp. 609-615, Berkeley, CA, 2001.

B. Magerko and J. Laird. Building an interactive drama architecture. In First International Conference on Technologies for Interactive Digital Storytelling and Entertainment, pp. 226-237, Darmstadt, Germany, 2003.

M. Mateas and A. Stern. Facade: An experiment in building a fully-realized interactive drama. In Game Developers Conference, Game Design track, San Jose, USA, 2003.

R. M. Young, M. O. Riedl, M. Branly, A. Jhala, R. J. Martin, and C. J. Saretto. An architecture for integrating plan-based behavior generation with interactive game environments. Journal of Game Development, 1(1):51-70, 2004.

Y. Cai et al., "Context Modeling with Evolutionary Fuzzy Cognitive Map in Interactive Storytelling," IEEE Int'l Conf. Fuzzy Systems (WCCI 08), IEEE CS Press, 2008, pp. 2320-2325.

Foreign Communication from a Related Counterpart Application, Office Action dated Jan. 3, 2019, China Application No. 201580015141.3.

\* cited by examiner

COMPUTERIZED METHOD AND SYSTEM FOR PERSONALIZED STORYTELLING

CROSS-REFERENCE TO RELATED APPLICATIONS

The present application is a filing under 35 U.S.C. 371 as the National Stage of International Application No. PCT/SG2015/000092, filed Mar. 25, 2015, entitled "COMPUTERIZED METHOD AND SYSTEM FOR PERSONALIZED STORYTELLING," which claims the benefit of U.S. Provisional Application No. 61/970,081 filed on Mar. 25, 2014, both of which are incorporated herein by reference in their entirety for all purposes.

FIELD OF THE INVENTION

The present invention relates to a computerized method and system for presenting customers with a personalised retail experience, using a personalized storytelling system.

BACKGROUND OF THE INVENTION

Individual increasingly uses smartphones with strong computational power, information connectivity, and social capability. Taking Singapore as an example, the penetration of smartphones in 2013 had reached 87%. As the number of people using smartphones rises, the scanning of 2D barcodes for various activities also increases. According to Wikipedia, a 2D barcode is a 2-dimensional way of representing information, which can be used to store text, a URL and/or other long information. A 2D barcode may be presented to a customer in a certain location, for the user to photograph using his smartphone, and the image is passed wirelessly to a server, which downloads information to the smartphone relating to the location. In one example, the 2D barcode relates to a product which is for sale, and this provides a convenient solution for customers to obtain offers and information without complex operations; in fact, recognition technology is becoming mainstream for mobile branding.

However, current mobile branding using 2D barcodes is quite boring for users. For one thing, the information returned to the smartphone is the same for any customer whose smartphone receives the 2D barcode. Furthermore, the information generated based on the 2D barcode is generally very limited (e.g. simple text with static images). By comparison, users are able to get a vast amount of information about a product online (such as text descriptions, video advertisements, and social recommendations), which makes product banding and advertisement very easy and multi-dimensional. Thus, there is a big gap between offline shopping (retailing) using 2D barcodes, and online branding and advertising. Offline, customers are not able to obtain the abundant information about a certain product which is available online, e.g. product information, statistics, advertisement, social comments from friends and interested community etc. This prevents the customers from trying new products and services during offline retailing.

Accordingly, there is a need to provide a shopping experience at a retail location, which would augment the offline shopping experience with the enjoyable elements of online shopping, in terms of visual experience, user interaction experience, technology enabling experience and so on, to brand the products personalized with fun.

Storytelling is a kind of activity that appears everywhere in our daily life for people to share information and convey ideas. It has been available throughout human history, and creates a great impact to every aspect of human life. In business, storytelling is considered as the ultimate weapon of success [1]. A compelling story is crucial to the success of a product or service. The customer needs to convince himself/herself to choose one product rather than its competitors. As well as fundamental information, a story contains culture, value and more besides, and is able to connect people emotionally. As a mixture of conventional storytelling and user interactions, interactive storytelling in the virtual/digital environment enables the users to interact with the storyteller in real-time, so that dynamic and personalized stories can be generated to provide unique experience. This has become a hot area in today's interactive storytelling research. It may use an "agent" which is a software entity that can sense, reason and act. The storyteller agent can run itself to pursue its own goals of unique story event mobile and proactively. A number of research works have been done to create intelligent agents which can conduct storytelling smartly [3, 4, 5, 6].

SUMMARY OF THE INVENTION

In general terms, the present invention proposes an agent-based storytelling system based on barcodes, especially 2D barcodes, and online multimedia, which is personalized to a potential customer ("user"). It can be used to conduct mobile branding and advertisement via a personalized story, and is able thereby to augment offline shopping with online shopping experience.

Each customer is unique in many dimensions: gender, age, hobby, profession etc. He or she is involved within different online multimedia, e.g. social networks (Facebook®, Twitter®), advertisement commercials, and webpages and so on. It is a great challenge to create a personalized and humanized branding or advertisement for different people engaged in offline shopping. The present invention may extract the product information using the 2D barcode and personal information, and transform branding information obtained online (text, video, social comments, etc.) using the product information into a personalized compelling story, and then present it to the customer in his/her own way, to help the customer build a proactive view of the product in his/her own perspective.

Embodiments of the invention make possible the following advantages over the current approaches:

a. The information is an infusion of different kinds of media (e.g. text information, video, statistics report).
b. The information is presented in the storytelling by a storyteller agent to enable more engaging user interactions rather than a simple and passive information portal.
c. The storytelling is personalized to the customer, i.e. the story (e.g. one or more scenes comprising one or more dramatic characters) is constructed based on the customer's preferences, profile, and previous shopping experiences. Compared to simple information retrieval and aggregation, a personalized story is compelling and informative, which can gain high consensus with the user.

Accordingly, embodiments of the invention can be used for personalized and humanized mobile branding and advertisement to enhance the success rate of selling the product.

The invention may be expressed as a method. Alternatively, it may be expressed as a computer system, such as a server, having a data storage device and storing program instructions operative by a processor of the computer system to cause the processor to perform the method.

The method is preferably performed automatically, that is substantially without human involvement, except for the initiation by the user (e.g. by capturing an image of the barcode).

The user captures the image using a camera which is a part of a mobile device (such as a smartphone, or a tablet). The story is then transmitted to the mobile device, and presented to the user using the screen of the mobile device.

The term multimedia is used here to include any one or more of a video, a still image and/or a soundtrack. Preferably, the story is presented using at least one video, and at least one soundtrack.

The term "agent" is used in this document as is conventional in computer science. It is a computer program that acts for a user or other program in a relationship of agency, to decide which, if any, action is appropriate. Thus, an agent is an intelligent software/hardware entity that can extract and mine external stimuli, reason based on its knowledge and act to fulfill its goals. The basic attributes of a software agent are that agents are not strictly invoked for a task, but activate themselves. Other typical properties of an agent include that they: may reside in wait status on a host; may enter run status on a host upon starting conditions, and may invoke other tasks including communication.

The term "story" is used to mean a sequence of events (scenes) which are connected semantically to convey some message (values).

BRIEF DESCRIPTION OF THE DRAWINGS

A non-limiting embodiment of the invention will now be described for the sake of example only with reference to the following figures, in which.

DETAILED DESCRIPTION OF THE EMBODIMENTS

Figure 1:
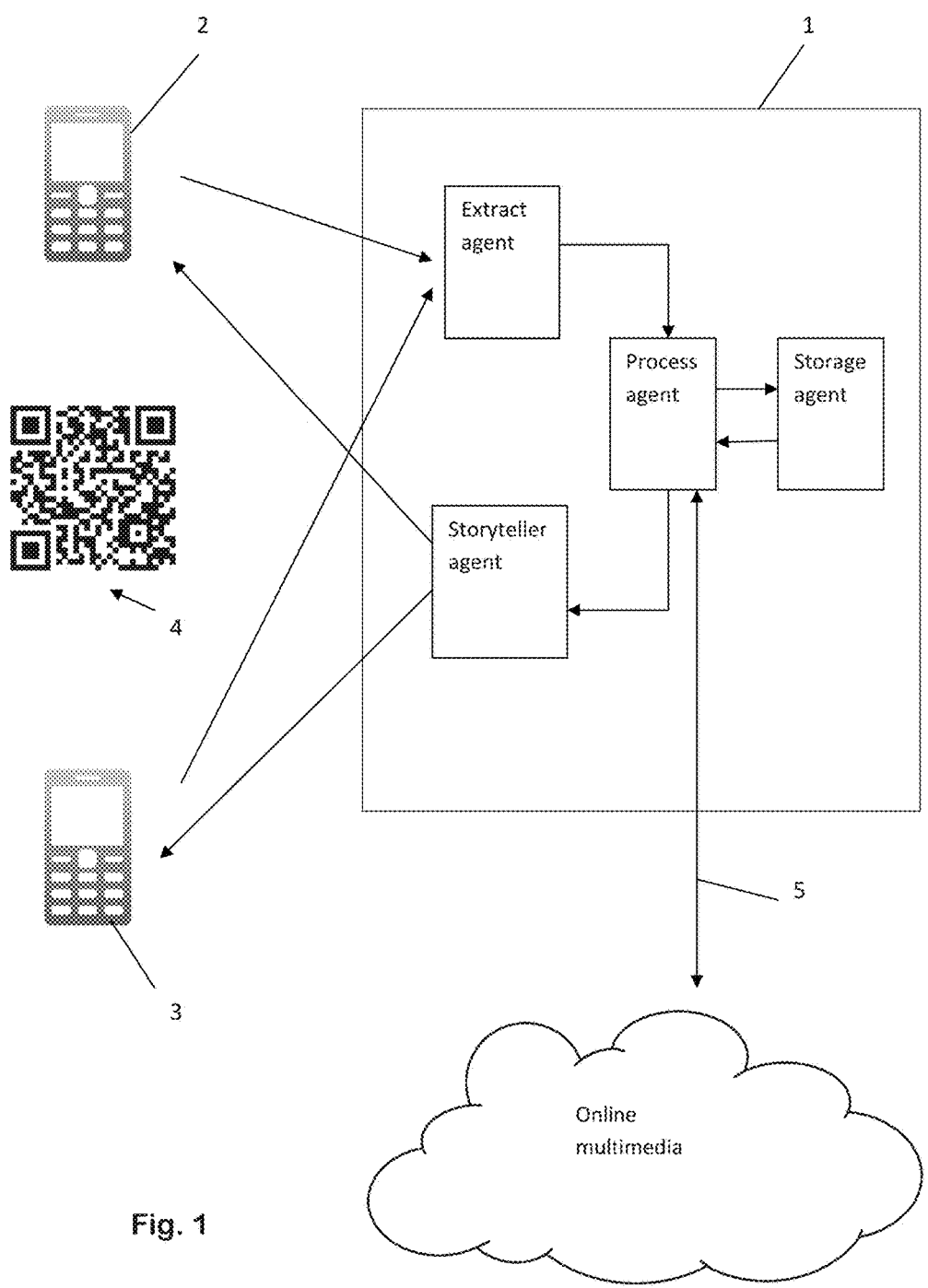
FIG. 1 shows schematically an embodiment of the invention.

Referring firstly to FIG. 1, an embodiment 1 of the invention of the invention is shown. The embodiment 1 is a system for using personalized storytelling to promote mobile branding and advertisement. The embodiment 1 uses the DIRACT (i.e. direct and act) storytelling architecture described in detail in [2], and a plurality of DIRACT agents. Each agent is an intelligent software entity that can sense the user information and context information, process the information with previous knowledge and feedback to the user. It is goal-oriented which can automate its actions by itself.

The embodiment communicates (over any wireless communication network) with the smartphones 2, 3 of a plurality of respective customers. For simplicity, the respective smartphones 2, 3 of two customers "A" and "B" are shown, but the number of customers may be much higher.

The customers A and B, and their smartphones, are located in a retail location (e.g. a store, or shopping mall). Each of their smartphones 2, 3 includes an application which the respective customer uses to scan a 2D barcode 4 located in proximity to certain a certain product. For example, if the product is goods, the barcode may be printed on packaging of the goods. If the product is a service (such as a travel booking service) the 2D barcode may be displayed at a location where the service is offered. The application then sends a message including the 2D barcode, and data about the respective customer (e.g. any one or more of a user id, his or her current location, and/or the current time, etc.) to the embodiment 1.

The embodiment 1 uses the barcode to obtain information about the product, and uses this in combination with stored information about each customer, to generate a respective story of branding and advertisement. The story will be presented on the respective customer's smartphone 2, 3 in the form of media infusion of text, audio, and video. Customer A and customer B thus will get different respective story upon scanning the same 2D barcode, due to their different preferences and different related online multimedia.

The embodiment 1 is a multi-agent system, which contains the following running agents:

a) Extract Agent: After each customer scans the 2D barcode of the product, the 2D barcode is sent to the Extract Agent. The Extract Agent will use the 2D barcode to extract product information about the product (e.g. its name, its producer, a description etc.) from a database inside the embodiment 1 or outside (such as a database to which the embodiment is connected using the internet). The Extract Agent further obtains from the message information about the customer (customer id, current location, current time etc.). The two forms of information extracted by the Extract Agent are sent to "Process Agent" for further processing.

b) Storage Agent: The Storage Agent stores further information ("recorded customer information") about each of the customers (e.g. their gender, preference, education, profession, and/or previous shopping activities etc.) and information about the product. The Storage Agent pre-processes the data to most related elements for the Process Agent to customize the branding story.

c) Process Agent: The Process Agent is the kernel of the embodiment 1. The Process Agent receives the data extracted by the Extract Agent, and uses the information about the customer to generate a request to the Storage Agent to send the Process Agent the recorded customer information. The Process Agent then analyses the various items of information gathered from the Extract Agent and Storage Agent, and generates a story. The story may include further information gathered over the internet from one or more online data sources, such as social media (e.g. Facebook® and Twitter®). The story includes branded content which will interest the customer (e.g. advertisement commercial, friends' comments on the product). The Process Agent will also update the "Storage Agent" about the user's feedback about the generated story after the processing, in order to provide more engaging stories in the future. The Process Agent will rank the most important information about the product and the customer. The story event will be generated based on the information in the order of the rank.

d) Storyteller Agent: The Storytelling agent presents the story received from the Process Agent to the customer. It generates, for example by interacting with the application on the respective smartphone 2, 3, a graphical user interface on the smartphone 2, 3 which is suitable for the corresponding customer. Unlike conventional personalized video generation (such as in [8]), the story is presented as a virtual storybook, with narratives from the storyteller. The story incorporates data from the social media. In this way it resembles the personalized content in [9], but in [9] the content is not advertising content, and is not extracted using a barcode.

Importantly, the Process Agent is able to derive the personalized storytelling based on the user preferences and real-time context changes. It does this using a Evolutionary Fuzzy Cognitive Map (E-FCM), which is a computational model previously proposed by us to model the causal relationships among a number of concepts, and simulate the concept state change [7]. An E-FCM designer is developed to author a story with a collection of story scenes. The software has an intuitive user interface with simple drag-and-drop operations to generate story and simulate easily. The main user interface of the designer is shown in FIG. 2(a), and FIGS. 2(b) and 2(c) illustrate a drag and drop operation performed using the interface.

The interface is a tool to generate the logic of the "Process Agent" to select the most relevant story event based on user interactions as well as external stimuli.

Figure 2:
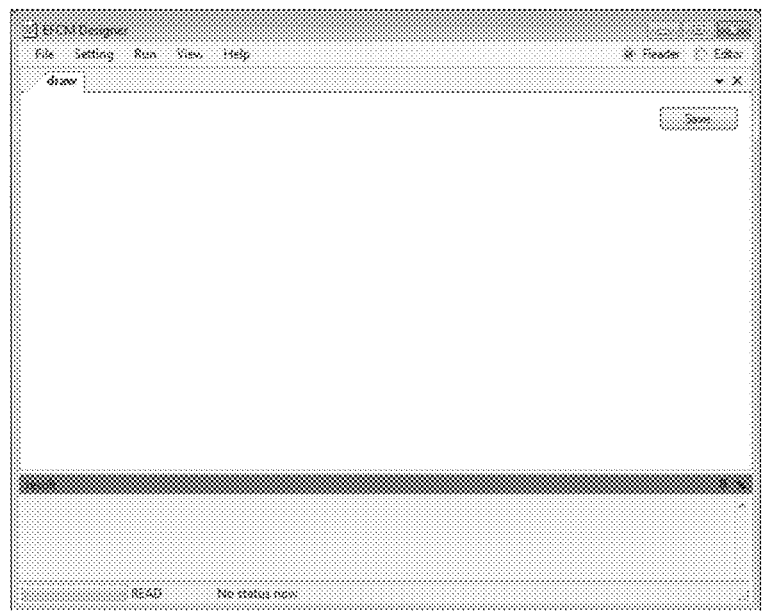
FIG. 2 is composed of FIG. 2(a), which shows an interface used by a designer function in the embodiment of FIG. 1, and FIGS. 2(b)-(c) which show a drag and drop operation performed using the interface.
Figure 2:
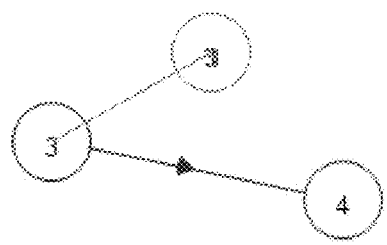
Figure 2:
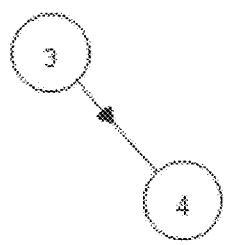

In FIGS. 2(b) and (c), unit 3 and unit 4 are two objects of story. The user is able to construct the logic easily with an intuitive graphical user interface, with a simple drag and drop operation. In other words, with the designer, it is easy to construct the story with user interactions and context changes with intuitive drag-and-drop operations.

Figure 3:
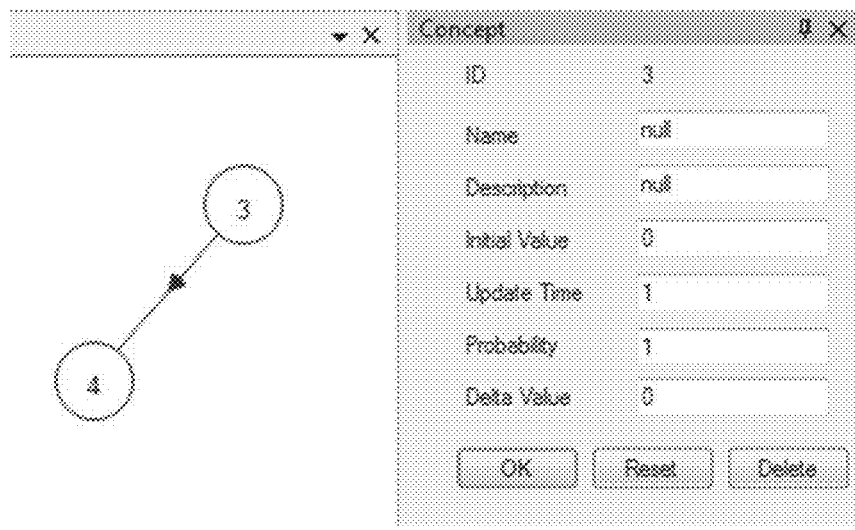
FIG. 3 is composed of FIGS. 3(a) and 3(b) which show interfaces presented by the designer function to define respectively concepts and causal relationships in a story.
Figure 3:
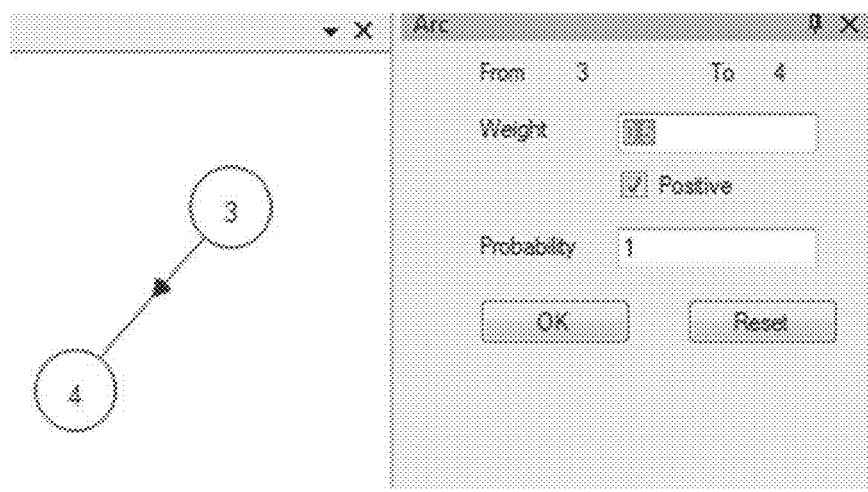

The designer further produces interfaces as shown in FIGS. 3(a) and 3(b). The interface of FIG. 3(a) is used to set concepts of the story (user preferences, contexts, story scenes). The interface of FIG. 3(b) is used to set the causal relationships. By changing the parameters in FIGS. 3(a) and (b), the user can construct the value for each story event, and the weight to activate different story events. For example, a girl prefers advertisement of harmless dolls while a man prefers power and speed. By setting different weights to activate different story events, different users can create personalized stories. Using the interfaces of FIGS. 3(a) and (b), it is easy to set the concepts as well as the causal relationships.

Once a customer has viewed the story using the corresponding smartphone 2, 3, he or she may be enabled to post it to a social media website for viewing by other individuals (e.g. potential customers) associated with the customer (e.g. part of the customer's social network on that site). For example, the application on the smartphone 2, 3 may be operative to receive a command from the customer, to post the story to the social media website (e.g. using the system 1, or directly). For example, the story may be posted to a Facebook® page of the customer, for viewing by the customer's Facebook® friends. This enable the shopping-together experience with friends remotely.

Although only a single embodiment of the invention has been described in detail, many variations are possible as will be clear to a skilled reader, within the scope of the appended claims.

REFERENCES

The disclosure in the following references is incorporated by reference in its entirety.
1. Jonathan Gottschall, "Why storytelling is the ultimate weapon?" http://www.fastcocreate.com/1680581/why-storytelling-is-the-ultimate-weapon.
2. Yundong Cai, Zhiqi Shen, Chunyan Miao, Ah-Hwee Tan: DIRACT: Agent-Based Interactive Storytelling. International Conference on Agent Technology 2010: 273-276.
3. F. Charles, S. Mead, and M. Cavazza. Character-driven story generation in interactive storytelling. In Virtual Systems and Multimedia, 2001. Proceedings. Seventh International Conference on, pages 609-615, Berkeley, Calif., 2001.
4. B. Magerko and J. Laird. Building an interactive drama architecture. In First International Conference on Technologies for Interactive Digital Storytelling and Entertainment, pages 226-237, Darmstadt, Germany, 2003.
5. M. Mateas and A. Stern. Façade: An experiment in building a fully-realized interactive drama. In Game Developers Conference, Game Design track, San Jose, USA, 2003.
6. R. M. Young, M. O. Riedl, M. Branly, A. Jhala, R. J. Martin, and C. J. Saretto. An architecture for integrating plan-based behavior generation with interactive game environments. Journal of Game Development, 1(1):51-70, 2004.
7. Y. Cai et al., "Context Modeling with Evolutionary Fuzzy Cognitive Map in Interactive Storytelling," IEEE Int'l Conf. Fuzzy Systems (WCCI 08), IEEE CS Press, 2008, pp. 2320-2325.
8. WO 2007/053898, "Personalised video generation".
9. WO 2008/043143, "Personalised content generation".

The invention claimed is:

1. A computer system for augmenting an offline shopping experience by presenting to a user personalised content relating to a product which is available for purchase at a retail location, the computer system comprising:
   an interface for receiving a message from a mobile device of the user, the message encoding (a) information about the user, and (b) a captured image of a barcode associated with the product;
   a server, comprising:
   (i) a processor and
   (ii) a data storage device, storing:
      (a) further information relating to the user;
      (b) program instructions, the program instructions being operative to cause the server to implement one or more agents, to:
      automatically extract from the message the information about the user;
      automatically obtain the further information relating to the user based on the extracted information about the user;
      automatically obtain product information relating to the product, including multimedia data, using the barcode;
      receive an input indication comprising a user selection of values for setting a story concept and causal relationships between story events;
      automatically construct a story incorporating the multimedia data using the further information and the product information and the input indication, the story being personalised to the user and is constructed based on the input from the user; and
      automatically transmit data via the interface to the mobile device, wherein the mobile device presents the story to the user during the offline shopping experience.

2. A system according to claim 1 in which the program instructions are further operative to cause the processor to obtain, using the internet, additional data relating to the user from at least one social media site, the additional data also being used to construct the story.

3. A system according to claim 1, wherein the story is constructed based on the user's preferences, profile and/or previous shopping experiences.

4. A method for performance by a computer system for augmenting an offline shopping experience by presenting to a user personalised content relating to a product which is available for purchase at a retail location, the method comprising the computer system:

receiving an input indication, the input indication comprising a user selection of values for setting a story concept and causal relationships between story events;

receiving a message from a mobile device of the user, the message encoding (a) information about the user, and (b) a captured image of a barcode associated with the product;

automatically extracting from the message the information about the user;

automatically obtaining the further information relating to the user based on the extracted information about the user;

automatically obtaining product information relating to the product, including multimedia data, using the barcode;

automatically constructing a story incorporating the multimedia data using the further information and the product information and the input indication, the story being personalised to the user; and automatically transmitting data via the interface to the mobile device, wherein the mobile device presents the story to the user during the offline shopping experience.

5. A method according to claim 4 in which the barcode is a 2D barcode.

6. A method according to claim 4 further including the computer system obtaining, using the internet, additional data relating to the user from at least one social media site, the additional data being used to construct the story.

7. A method according to claim 4, further including, upon a command by the user, transmitting the story to a social media site for viewing by other individuals associated with the user.

8. A method according to claim 4, wherein the story is constructed based on the user's preferences, profile and/or previous shopping experiences.

\* \* \* \* \*